(12) United States Patent
Jackson

(10) Patent No.: US 8,151,103 B2
(45) Date of Patent: Apr. 3, 2012

(54) SYSTEM AND METHOD FOR PROVIDING OBJECT TRIGGERS

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 931 days.

(21) Appl. No.: 10/530,578

(22) PCT Filed: Mar. 11, 2005

(86) PCT No.: PCT/US2005/008291
§ 371 (c)(1), (2), (4) Date: Nov. 24, 2008

(87) PCT Pub. No.: WO2005/089241
PCT Pub. Date: Sep. 29, 2005

(65) Prior Publication Data
US 2011/0119478 A1  May 19, 2011

Related U.S. Application Data

(60) Provisional application No. 60/552,653, filed on Mar. 13, 2004.

(51) Int. Cl.
*G06F 9/00* (2006.01)
*G06F 15/177* (2006.01)
*G06F 15/00* (2006.01)
*G06F 9/46* (2006.01)

(52) U.S. Cl. .............. 713/100; 713/1; 709/221; 712/15; 712/28; 718/102

(58) Field of Classification Search .............. 713/1, 100; 709/221; 712/15, 28; 718/102
See application file for complete search history.

(56) References Cited

U.S. PATENT DOCUMENTS

| | | | |
|---|---|---|---|
| 6,122,664 A * | 9/2000 | Boukobza et al. | 709/224 |
| 6,338,149 B1 | 1/2002 | Ciccone, Jr. et al. | |
| 6,366,945 B1 * | 4/2002 | Fong et al. | 718/104 |
| 6,816,905 B1 | 11/2004 | Sheets et al. | |
| 6,845,416 B1 | 1/2005 | Chasmawala et al. | |
| 7,080,142 B2 * | 7/2006 | Galloway et al. | 709/224 |
| 7,278,142 B2 * | 10/2007 | Bandhole et al. | 718/104 |
| 7,552,171 B2 * | 6/2009 | Chidambaran et al. | 709/203 |
| 7,660,880 B2 * | 2/2010 | Ting et al. | 709/223 |
| 2002/0120741 A1 | 8/2002 | Webb et al. | |

(Continued)

FOREIGN PATENT DOCUMENTS
WO   WO 01/14987   3/2001

(Continued)

OTHER PUBLICATIONS

XP, 002541356.

(Continued)

*Primary Examiner* — Stefan Stoynov

(57) ABSTRACT

The present invention provides for systems and methods of dynamically controlling a cluster or grid environment. The method comprises attaching a trigger to an object and firing the trigger based on a trigger attribute. The cluster environment is modified by actions initiated when the trigger is fired. Each trigger has trigger attributes that govern when it is fired and actions it will take. The use of triggers enables a cluster environment to dynamically be modified with arbitrary actions to accommodate needs of arbitrary objects. Example objects include a compute node, compute resources, a cluster, groups of users, user credentials, jobs, resources managers, peer services and the like.

34 Claims, 3 Drawing Sheets

U.S. PATENT DOCUMENTS

| | | |
|---|---|---|
| 2003/0037194 A1 | 2/2003 | Mukherjee |
| 2003/0120704 A1 | 6/2003 | Tran et al. |
| 2003/0187992 A1 | 10/2003 | Steenfeldt et al. |
| 2004/0249947 A1 | 12/2004 | Novaes et al. |
| 2005/0278760 A1 | 12/2005 | Dewar et al. |
| 2005/0283534 A1 | 12/2005 | Bigagli et al. |

FOREIGN PATENT DOCUMENTS

| | | |
|---|---|---|
| WO | WO 2005/017783 | 2/2005 |

OTHER PUBLICATIONS

XP, 002541357.

XP, 002541363.

XP, 001091827.

Oracle, "Oracle8i-Appilcation Developer's Guide—Fundamentals", Release 2(8.1.6), Dec. 1999, retrieved online from: http://download.oracle.com/docs/cd/A84870_01/doc/appdev.816/a76939.pdf.

* cited by examiner

FIG. 5

Create Trigger 1

Trigger Creation
Create a trigger for when the reservation [starts ▽] — 502

Trigger Start Time
Have the trigger start [0 ⇕] minutes [before ▽] the reservation starts. — 504

Trigger Action
When the trigger launches have it [cancel the reservation. ▽] — 506

Trigger Executable
The application or script to execute is [ 📁 ] — 508
The application takes the following arguments [ ] — 510

Reservation Utilization Threshold
Utilization Percentage Threshold [0 10 20 30 40 50 60 70 80 90 100] — 512

[Save Trigger] [Erase Trigger] [Cancel]

SYSTEM AND METHOD FOR PROVIDING OBJECT TRIGGERS

PRIORITY CLAIM

The present application claims priority to U.S. Provisional Application No. 60/552,653 filed Mar. 13, 2004, the contents of which are incorporated herein by reference.

RELATED APPLICATIONS

The present application is related to U.S. patent application Ser. No. 10/530,583; U.S. patent application Ser. No. 10/530,582; U.S. patent application Ser. No. 10/530,581; U.S. patent application Ser. No. 10/530,577; U.S. patent application Ser. No. 10/530,576; U.S. patent application Ser. No. 10/589,339; U.S. patent application Ser. No. 10/530,580, and U.S. patent application Ser. No. 10/530,575, filed on the same day as the present application. The content of each of these cases is incorporated herein by reference.

BACKGROUND OF THE INVENTION

1. Field of the Invention

The present invention relates to triggers in the context of compute resource management and more specifically to a system and method of generating triggers which could be attached to any other scheduling object.

2. Introduction

The present invention applies to computer clusters and computer grids. A computer cluster may be defined as a parallel computer that is constructed of commodity components and runs commodity software. FIG. 1 illustrates in a general way an example relationship between clusters and grids. A cluster 110 is made up of a plurality of nodes 108A, 108B, 108C, each containing computer processors, memory that is shared by processors in the node and other peripheral devices such as storage discs connected by a network. A resource manager 106A for the node 110 manages jobs submitted by users to be processed by the cluster. Other resource managers 106B, 106C are also illustrated that may manage other clusters (not shown). An example job would be a weather forecast analysis that is compute intensive that needs to have scheduled a cluster of computers to process the job in time for the evening news report.

A cluster scheduler 104A may receive job submissions and identify using information from the resource managers 106A, 106B, 106C which cluster has available resources. The job would then be submitted to that resource manager for processing. Other cluster schedulers 104B and 104C are shown by way of illustration. A grid scheduler 102 may also receive job submissions and identify based on information from a plurality of cluster schedulers 104A, 104B, 104C which clusters may have available resources and then submit the job accordingly.

Grid/cluster resource management generally describes the process of identifying requirements, matching resources to applications, allocating those resources, and scheduling and monitoring grid resources over time in order to run grid applications as efficiently as possible. Each project will utilize a different set of resources and thus is typically unique. In addition to the challenge of allocating resources for a particular job, grid administrators also have difficulty obtaining a clear understanding of the resources available, the current status of the grid and available resources, and real-time competing needs of various users.

Several books provide background information on how to organize and create a cluster or a grid and related technologies. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Mass. Institute of Technology, 2003.

Virtually all clusters have been static which means that an administrator establishes the policies for the cluster, sets up the configuration, determines which nodes have which applications, how much memory should be associated with each node, which operating system will run on a node, etc. The cluster will stay in the state determined by the administrator for a period of months until the administrator takes the entire machine off-line to make changes or modifications. Then the machine is brought back on-line where another 10,000-100,000 jobs may be run on it.

Within this static cluster environment, there is the ability to have something called a job step, a job step allows an application to prepare or modify its environment within the constraints of the compute resources provided by the cluster. For example a job may consist of three steps, the first step is pulling data off of a storage system and transferring the data onto a local file system. The second step may actually process the data and a third step may take the data and go through a second processing step and push it back out to a storage system. These job steps enable some additional functionality for the job in that it allows a job to work within the environment they have.

However, there are some deficiencies in this process. Using job steps does nothing for allowing the jobs to actually change the compute environment provided by the cluster in any way. Job steps operate within the cluster environment but have no control or ability to maximize efficiencies within the environment or adjust the environment. They are static in the sense that they are limited to manipulation of tasks within the given cluster environment. What is needed in the art is a method of improving the efficiency of the compute environment via a device associated with a job or other object.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the art discussed above. The cluster that receives a job submission according to the present invention is dynamic in that the cluster and the resources associated with the cluster may dynamically modify themselves to meet the needs of the current workload. To accomplish this dynamic component of the cluster, the present invention further involves introducing triggers.

A trigger is an object which can be attached or associated with any other scheduling object. A scheduling object can be, for example, one of: a compute node, compute resources, a reservation, a cluster, user credentials, groups or accounts, a job, a resource manager, other peer services and the like. Any scheduling object can have any number of triggers associated with it.

The invention comprises various embodiments associated with dynamic clusters and triggers. These embodiments include systems, methods and computer-readable media that provide the features of the invention. The method embodiment of the invention comprises a method for dynamically modifying a cluster, the method comprising attaching a trigger to a scheduling object and firing the trigger based on a trigger attribute, wherein the cluster environment is modified by an action take by the trigger.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a graphical user interface used to create triggers.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The "system" embodiment of the invention may comprise a computing device that includes the necessary hardware and software components to enable a workload manager or a software module performing the steps of the invention. A workload manager manages the compute environment by reserving, at a first time, resources in the compute environment to yield a reservation. The resources associated with the reservation are then consumed by jobs at a second time which is later than the first time. Such a computing device may include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiment of the invention has any specific hardware components and any known or future developed hardware configurations are contemplated as within the scope of the invention when the computing device operates as is claimed.

Figure 1:
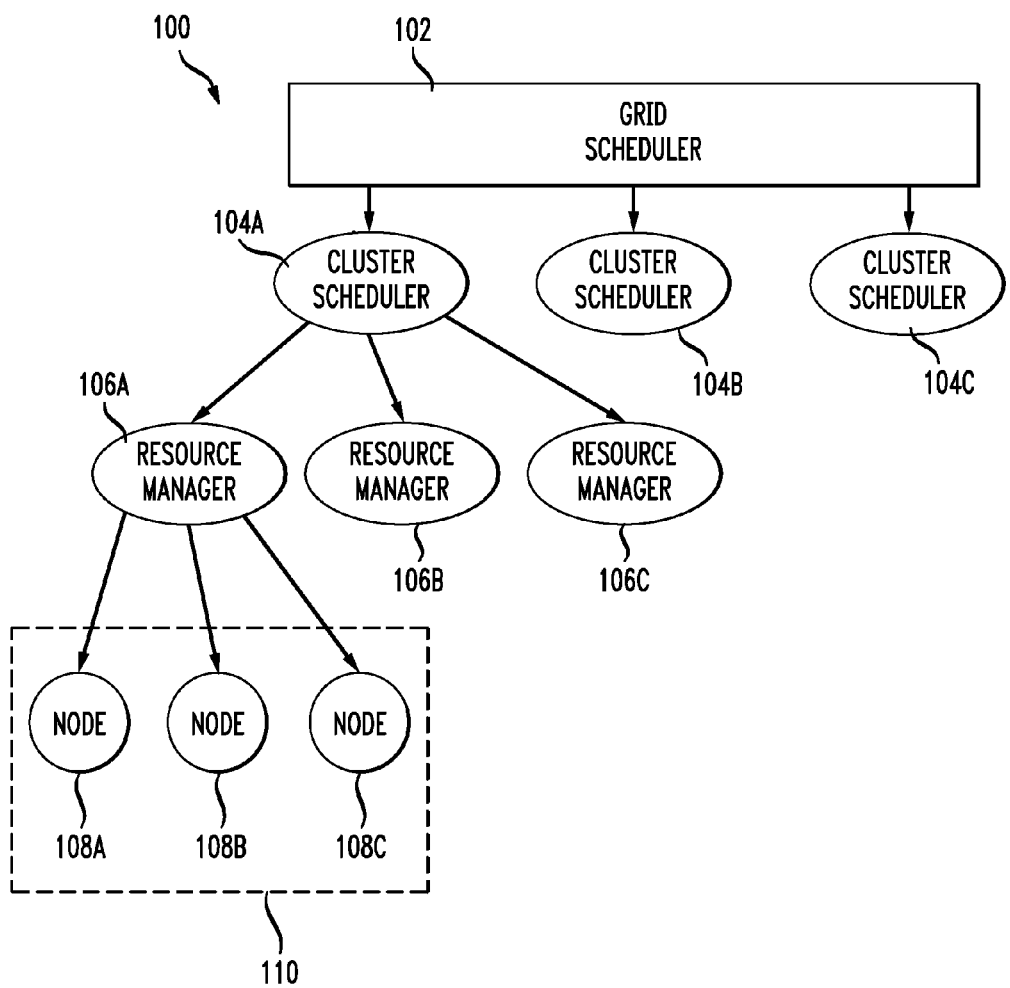
FIG. 1 illustrates generally a prior art arrangement of clusters in a grid.
Figure 2:
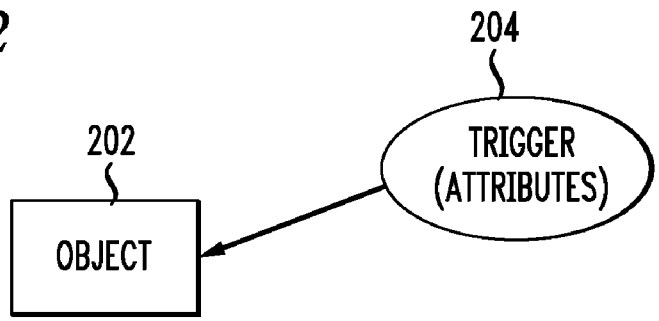
FIG. 2 illustrates a trigger attached to an object.

The present invention enables the dynamic modification of compute resources within a compute environment such as a cluster or a grid by the use of triggers. FIG. 2 illustrates a trigger 204 being attached to an object 202. The object 202 is preferable a scheduling object and each trigger 204 is configured with a plurality of attributes. Example objects include a compute node, a reservation within a cluster, a cluster itself, a user, a job submitted by a user to a cluster manager, a resource manager, etc. As can be appreciated, an "object" in the context of cluster management may be any number of concepts to which a trigger may be attached.

An example attribute associated with a trigger includes an event type, which means that one would like this trigger to fire or execute based on a particular event occurring such as the creation of the object, the starting, execution, cancellation or termination of an object, or an object state.

Other attributes associated with a trigger include a timeout, an offset feature, a particular action (such as send an e-mail to the administrator), dependencies, an argument list, a state and a threshold value. This is not meant to be an exhaustive complete list. Other attributes may also be attached to the trigger. For example, meaning dependencies can be based on attributes within the object, wherein if a job is now running, a dependency may be that it fires if a parameter is set to "true". In that case, the trigger also has a variable it sets to cascade other triggers by setting variables that cause other triggers to fire. Such parameters may relate to things like a threshold, a re-arm time, time-out values and durations. In this manner, a cascade of triggers may fire based on various modified and set parameter from one trigger to the next. Other values that may be used to fire triggers include such parameters as: user credentials, jobs, groups, jobs per user and other types of thresholds. For example, whenever a user exceeds X number of jobs, launch a trigger to take an action. A group-based parameter example is: (1) if user John has more than 18 idle jobs, then send a note to an administrator; and (2) if a group "staff" resource availability query receives a reply with resources more than two hours out, then launch a trigger to modify reservation Y to provide more resources.

Figure 3:
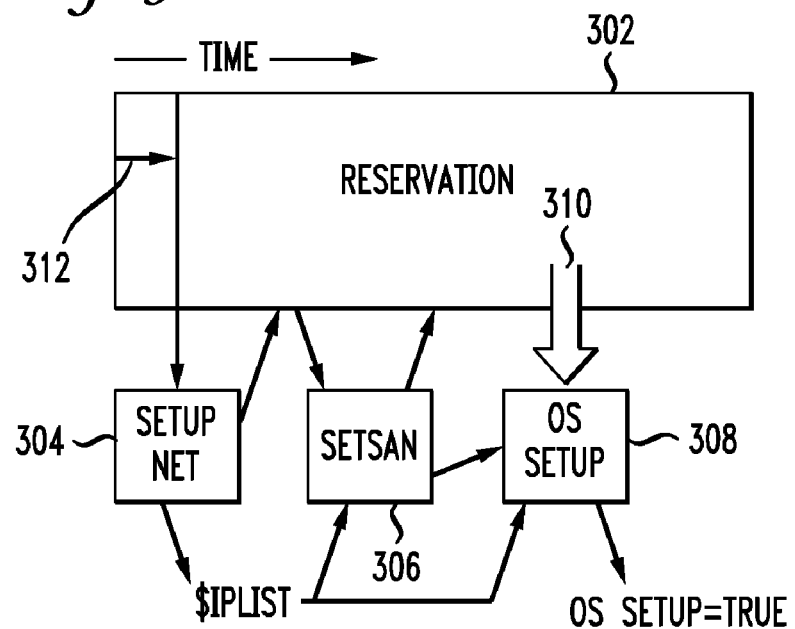
FIG. 3 illustrates an example of the user of triggers according to an aspect of the invention.
Figure 4:
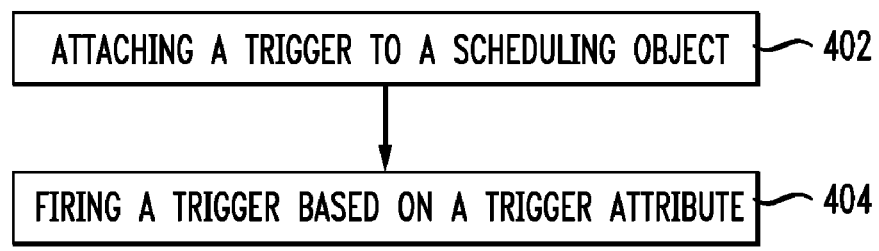
FIG. 4 illustrates a method according to an embodiment of the invention.

The offset feature involves establishing that the trigger will fire either before or after an event has occurred. The example trigger in FIG. 3 illustrates their use in a hosting environment in which a customer wants to reserve a block of resources for a particular time frame and the administrator wants to dynamically provision those resources. FIG. 3 illustrates a reservation 302 that is processing in time. A trigger 304 is attached to the object with attributes including an offset to begin a certain period of time (say two minutes) 312 after the reservation 302 begins its process. The trigger 304 has as an attribute an action to take which is to set up a network and generate an ARGLIST variable called $IPlist and return that value to the reservation environment. The trigger 304 also transmits the $IPList to another trigger 306. The trigger 306 has a start time offset but also a dependency that it does not fire until the $IPList variable is set. Once the variable is set, the trigger 306 sets up a storage area network, brings in the resources and makes the resources available to the reservation. When trigger 306 completes, a third trigger 308 performs an operating system setup, which also has a dependency on the $IPList variable being set to a value as well as a variable being set to "true". When both of those parameters are satisfied, trigger 308 fires and sets up the operating system and application environment and completes. The output of trigger 308 is a parameter stating whether the operating system setup was successful ("true") or not.

Independent of these triggers is an additional trigger 310 that is set to fire at a fixed offset from the start of the reservation, and it performs a health check to verify that the OS setup variable which is setup by the trigger 308 is true. If it is not set to true, then trigger 310 is designed to do two things: (1) cancel the reservation itself and send an e-mail to the administrator and end user notifying them that there has been a failure and the reservation will not be available; and (2) retry the initial setup triggers or look for additional local in time at which these blocked resources could be made available and send an e-mail to the user saying we'll retry at this particular time. All of this is performed automatically through the use of triggers.

The above example provides an illustration of the various features of triggers, including the ability to start at an offset value, perform certain actions, having certain dependencies based on data being processed and received or other kinds of dependencies and produce and receive argument lists.

In addition, triggers can specify arbitrary actions allowing it to modify the scheduling state, to execute some process, to pull something in from off the Internet or to update a database. Any arbitrary action that can modify the environment, including destroying the object or reconfiguring the object. Furthermore, triggers have the ability to specify dependencies, saying the trigger can only fire when an event has occurred, the offset has been satisfied and certain other conditions such as variables have been set or other triggers completed with certain states. Each trigger can begin with a variable called in from an ARGLIST which allows you to pass in either static or dynamic variables to modify its behavior.

Also associated with triggers is the concept of a trigger timeout. This feature allows one to determine if a trigger has not fired yet or if it has completed successfully, unsuccessfully or if it's still in process of completing. With all these capabilities, an administrator can have essentially arbitrary control over decision making and process flow to modify the dynamic cluster environment in any way desired.

There are a number of ways to create a trigger. FIG. 5 illustrates a graphical tool 500 to simply point and click to associate the trigger and attach it to an object. The tool allows the user to select: the creation of a trigger when a reservation starts (or other selectable time via a drop down menu) 502, the trigger start time for a certain number of minutes before or after a reservation starts 504, an action launched by a trigger such as to cancel the reservation 506, an executable file to execute 508 or to receive an argument list 510 and a reservation utilization threshold 512.

Any action may launch a trigger. For example, if a resource manager goes down, or is a software license is about to expire, or a software application that is going to have a job executed with use of the software and it is out-of-date. Any event may launch a trigger.

The second method is to set it up in a configuration file a Moab™ configuration file is simply a flat text file which specifies associations and definitions of triggers. A third way is to simply use command line arguments to generate a trigger. These triggers can be created remotely over the network interface or locally. The following is an example of a command line method of creating triggers by user "Smith":

```
mrsvctl -c -h smith  -T \
'Sets=$Var1.$Var2.$Var3.!Net,EType=start,AType=exec,Action=/tmp/
Net.sh,Timeout=10'\
  -T \
Requires=$Var1.$Var2.$Var3,Sets=$Var4.$Var5,EType=start,AType=exec,
Action=/tmp/FS.sh'\
  -T \
Requires=$Var1.$Var2.$Var3.$Var4.$Var5,Sets=!NOOSinit.OSinit,
Etype=start,AType=exec,Action=
/tmp/OS.sh+$Var1:$Var2:$Var3:$Var4:$Var5' \
```

-continued

```
  -T \
Requires=failed,AType=cancel,EType=start \
  -T \
Eype=start,Requires=OSinit,AType=exec,Action=/tmp/success.sh \
  -T \
Requires=Net,EType=start,Sets=failed,AType=exec,Action=/tmp/fail.sh
```

This demonstrates a string of triggers, the first two set variables, the third one requires each of those variables to be set and there are also triggers that activate in case of failure.

An important feature that differentiates triggers from the job step is that there are other systems that allows one to have some sense of dependencies and modification but that is only within a single, given application or job. Job steps can modify their own data and the like but there's nothing that can modify either scheduling policy or scheduling objects, or scheduling environment, like triggers can. Triggers allow one to take any arbitrary action based on any arbitrary set of sensors. Triggers enable puffing in a wide ranging scope of information and having a wide scope of control. They are preferable written in the "c" programming language but there are no constraints on the type of programming language.

One of the attributes introduced above that is associated with a trigger is the threshold attribute. In addition to being able to say that a trigger will fire, when its dependencies are satisfied and its event has occurred and its offset has been satisfied, one may also specify whether a particular threshold and its threshold criteria has been satisfied. This feature allows one to have triggers that fire when particular qualities of service are not satisfied, when queue times have been exceeded, when anything that correlates to basically system performance has or has not been satisfied. When these metrics have not been satisfied or have been satisfied this provides some way one can have arbitrary actions occur.

Other examples of trigger usage are that an administrator can attach a trigger to a node and allow a node monitor such as Ganglia to perform monitoring activities such as detecting keyboard touches. So if a local user has begun to type or if the system detects a high level of data transmission or swapping, a trigger action may adjust the priority of that node so that it is no longer as likely to be selected for batch work load. The priority adjustment may reduce the probability that the node would be selected for a large job like a batch work load.

Performance triggers illustrate another type of trigger that is associated with a particular group or a particular user and a threshold parameter. The parameter may be a performance threshold parameter that is related to, for example, an average response time that is below a particular threshold. If that particular threshold is not satisfied, then the trigger fires and sends an e-mail off to an administrator and adjusts the priority of that user's jobs. The trigger may also dynamically modify the cluster resources to accommodate the at least one user's activities so that the user experiences a performance level at least at the threshold parameter.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method comprising:
   attaching a trigger to a job that is associated with a reservation of compute resources; and
   firing the trigger based on a trigger attribute, wherein the compute environment is modified by an action that is initiated when the trigger is fired, wherein the compute environment is managed by a workload manager that reserves, at a first time, the compute resources in the compute environment to yield the reservation, and wherein the job consumes the compute resources associated with the reservation at a second time which is later than the first time.

2. The method of claim 1, wherein the compute environment is one of a compute farm, a cluster and a grid.

3. The method of claim 1, wherein modifying the compute environment comprises at least one of modifying interfaces, sending a notification, destroying or modifying the object, adjusting policies, setting variables, creating files, executing scripts, provisioning nodes and utilizing a resource management service.

4. The method of claim 1, wherein attaching the trigger further comprises attaching the trigger to at least one of the reservation, a node, a user, a group of users, an administrator, an account, a QOS, a peer service, a class, a partition and a cluster.

5. The method of claim 1, wherein the trigger attribute is one of an event type, a timeout, an offset time, an action, a dependency, an action argument, a trigger state, an arbitrary input or output variable, a re-arm time and a duration.

6. The method of claim 5, wherein if the trigger attribute is an event type, the event type is one of: the creation of the object, the starting, execution, modification, detection of failure, cancellation or termination of the object or an object state.

7. The method of claim 1, wherein modifying the compute environment when the trigger is fired further comprises utilizing data from the fired trigger to fire a second trigger.

8. The method of claim 7, wherein the data from the fired trigger relates setting variables causes the second trigger to fire.

9. The method of claim 7, wherein the data from the fired trigger can further cause a plurality of triggers to fire.

10. The method of claim 7, wherein the data relates to one of a threshold, a re-arm time, a time-out parameter and a duration.

11. The method of claim 1, wherein the action that is initiated when the trigger fires comprises obtaining data from a remote source.

12. The method of claim 11, wherein the remote source is the Internet.

13. The method of claim 1, wherein the action that is initiated when the trigger fires comprises updating a database.

14. The method of claim 1, wherein the action initiated when the trigger fires is based on a dynamic variable received via an argument list.

15. The method of claim 1, wherein the trigger attribute is a threshold value.

16. The method of claim 15, wherein the threshold value relates to one of: a quality of service, a queue time being exceeded and system performance.

17. The method of claim 16, wherein system performance is related to at least one of CPU load, disk activity, network usage and memory usage.

18. The method of claim 15, wherein the threshold value relates to one of: individual user parameters, group parameters, job parameters, administrative parameters and credentials.

19. A method comprising:
    attaching a trigger to a job that is associated with a reservation of compute resources within a compute environment, wherein the trigger is arbitrary and user customizable;
    monitoring activities at a node via a node monitor; and
    upon detection of a specific activity at the node, firing the trigger to modify an attribute of the node, wherein the compute environment is managed by a workload manager that reserves, at a first time, the compute resources in the compute environment to yield the reservation, and wherein the job consumes the compute resources associated with the reservation at a second time which is later than the first time.

20. The method of claim 19, wherein the attribute of the node comprises one of the node's priority and state.

21. The method of claim 19, wherein the node monitor monitors for local activity comprising at least one of mouse activity, keystrokes, and high levels of memory, network or CPU usage.

22. The method of claim 19, wherein firing the trigger to modify the node's attribute further comprises reducing a probability that the node will not be selected for a batch work load.

23. A method of modifying a compute environment having at least one node, the method comprising:
associating a trigger with a job that is associated with a reservation of compute resources within the compute environment;
monitoring activities of the at least one user associated with a threshold parameter; and
upon detecting that the monitored activities of the at least one user fail to pass the threshold parameter, firing the trigger to modify the compute environment to attempt to enable the modified compute environment to accommodate the at least one user's activities at the threshold parameter, wherein the compute environment is managed by a workload manager that reserves, at a first time, the compute resources in the compute environment to yield the reservation, and wherein the job consumes the compute resources associated with the reservation at a second time which is later than the first time.

24. The method of claim 23, wherein the threshold parameter relates to credentials of the at least one user.

25. The method of claim 23, wherein the threshold parameter relates to group credentials of the at least one user.

26. The method of claim 23, wherein the threshold parameter is a performance threshold parameter.

27. The method of claim 23, further comprising, when the trigger fires, sending a notification to a compute environment administrator indicating the failure of the compute environment to pass the threshold parameter.

28. The method of claim 23, further comprising, when the trigger fires, adjusting a priority of jobs submitted by the at least one user to increase a probability that the at least one user's activities will pass the threshold parameter.

29. A system for controlling a compute environment, the system comprising:
a processor; and
a non-transitory computer-readable storage medium that stores instructions for controlling the processor to perform steps comprising:
attaching a trigger to a job that is associated with a reservation of compute resources; and
firing the trigger based on a trigger attribute, wherein the compute environment is modified by an action that is initiated when the trigger is fired, wherein the compute environment is managed by a workload manager that reserves, at a first time, the compute resources in the compute environment to yield the reservation, and wherein the job consumes the compute resources associated with the reservation at a second time which is later than the first time.

30. A system of modifying a compute environment, the system comprising:
a processor;
a non-transitory computer-readable storage medium storing instructions for controlling the processor to perform steps comprising:
attaching a trigger to a job associated with a reservation of compute resources within the compute environment;
monitoring activities associated with at least one of the job and the reservation;
firing the trigger to modify an attribute of a node upon detection of a specific activity associated with at least one of the job and the reservation, wherein the compute environment is managed by a workload manager that reserves, at a first time, the compute resources in the compute environment to yield the reservation, and wherein the job consumes the compute resources associated with the reservation at a second time which is later than the first time.

31. A non-transitory computer-readable medium storing instructions for controlling a computing device to control a compute environment, the instructions comprising the steps:
attaching a trigger to a job associated with a reservation of compute resources; and
firing the trigger based on a trigger attribute, wherein the compute environment is modified by actions initiated when the trigger is fired, wherein the compute environment is managed by a workload manager that reserves, at a first time, the compute resources in the compute environment to yield the reservation, and wherein the job consumes the compute resources associated with the reservation at a second time which is later than the first time.

32. A non-transitory computer-readable medium storing instructions for controlling a computing device to control a compute environment, the instructions comprising the steps:
attaching a trigger to a job that is associated with a reservation of compute resources in the compute environment;
monitoring activities at a node via a node monitor; and
upon detection of a specific activity at the node, firing the trigger to modify an attribute of the node, wherein the compute environment is managed by a workload manager that reserves, at a first time, the compute resources in the compute environment to yield the reservation, and wherein the job consumes the compute resources associated with the reservation at a second time which is later than the first time.

33. A non-transitory computer-readable medium storing instructions for controlling a computing device to control a compute environment, the instructions comprising the steps:
associating a trigger to a job that is associated with a reservation of compute resources within the compute environment;
monitoring activities of at least one of the job and the reservation and associated with a threshold parameter to yield monitored activities; and
upon detecting that the monitored activities fail to pass the threshold parameter, firing the trigger to modify the compute environment to attempt to enable a modified compute environment to accommodate at least one of the job and the reservation at the threshold parameter, wherein the compute environment is managed by a workload manager that reserves, at a first time, the compute resources in the compute environment to yield the reservation, and wherein the job consumes the compute resources associated with the reservation at a second time which is later than the first time.

34. A method of managing a compute environment, the method comprising:
attaching a trigger to a reservation for compute resources; and
firing the trigger based on an event such that the trigger performs an action associated with the compute environment, wherein the compute environment is managed by a workload manager that reserves, at a first time, the compute resources in the compute environment to yield the reservation and wherein a job consumes the compute resources associated with the reservation at a second time which is later than the first time.

* * * * *